(12) United States Patent
Xu et al.

(10) Patent No.: US 9,952,470 B2
(45) Date of Patent: Apr. 24, 2018

(54) COLOR FILM SUBSTRATE AND MANUFACTURE METHOD THEREOF AS WELL AS DISPLAY PANEL AND DISPLAY DEVICE

(71) Applicant: Boe Technology Group Co., Ltd., Beijing (CN)

(72) Inventors: Jian Xu, Beijing (CN); Hongfei Cheng, Beijing (CN); Yong Qiao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 14/778,715

(22) PCT Filed: May 6, 2015

(86) PCT No.: PCT/CN2015/078356
§ 371 (c)(1),
(2) Date: Sep. 21, 2015

(87) PCT Pub. No.: WO2016/086590
PCT Pub. Date: Jun. 9, 2016

(65) Prior Publication Data
US 2016/0327823 A1    Nov. 10, 2016

(30) Foreign Application Priority Data

Dec. 5, 2014   (CN) .................... 2014 2 0762232 U

(51) Int. Cl.
*G02F 1/1339*   (2006.01)
*G02F 1/1335*   (2006.01)

(52) U.S. Cl.
CPC .... *G02F 1/13394* (2013.01); *G02F 1/133512* (2013.01); *G02F 1/133514* (2013.01); *G02F 2001/13396* (2013.01)

(58) Field of Classification Search
None
See application file for complete search history.

(56) References Cited

U.S. PATENT DOCUMENTS

2010/0118255 A1* 5/2010 Hashimoto ......... G02F 1/13394
349/155
2012/0314163 A1* 12/2012 Joo .................... G02F 1/13394
349/106

(Continued)

FOREIGN PATENT DOCUMENTS

CN   101738788   6/2010
CN   101900910   12/2010

(Continued)

OTHER PUBLICATIONS

International Search Report and Written Opinion from PCT/CN15/078356 dated Jul. 28, 2015.

*Primary Examiner* — Edward Glick
*Assistant Examiner* — Anthony G Quash
(74) *Attorney, Agent, or Firm* — Calfee, Halter & Griswold LLP

(57) ABSTRACT

A color film substrate comprises a underlying substrate, a shading layer on the underlying substrate and photo spacers on the shading layer. The photo spacer comprises a top surface, a bottom surface and side surfaces for connecting the top surface and the bottom surface, and the top surface comprises at least one inclined face portion unparallel to the bottom surface.

15 Claims, 7 Drawing Sheets

(56) References Cited

U.S. PATENT DOCUMENTS

2012/0327337 A1* 12/2012 Waratani ................ G02B 5/201
　　　　　　　　　　　　　　　　　　　　　　　349/106
2015/0185514 A1* 7/2015 Zhao ................. G02F 1/133788
　　　　　　　　　　　　　　　　　　　　　　　349/43

FOREIGN PATENT DOCUMENTS

| CN | 103926749 | | | 7/2014 | |
|---|---|---|---|---|---|
| CN | 204302621 | | | 4/2015 | |
| JP | 2001117103 | A | * | 4/2001 | ......... G02F 1/13394 |
| JP | 2009258374 | | | 11/2009 | |
| KR | 1020070030574 | | | 3/2007 | |

* cited by examiner

COLOR FILM SUBSTRATE AND MANUFACTURE METHOD THEREOF AS WELL AS DISPLAY PANEL AND DISPLAY DEVICE

RELATED APPLICATIONS

The present application is the U.S. national phase entry of PCT/CN2015/078356, with an international filing date of May 6, 2015, which claims the benefit of Chinese Patent Application No. 201420762232.6 filed Dec. 5, 2014, the entire disclosures of which are incorporated herein by reference.

TECHNICAL FIELD

The application refers to a display technical field and specifically to a color film substrate and a manufacture method thereof, and a display panel and a display device.

BACKGROUND

A liquid crystal display panel comprises an array substrate and a color film substrate aligned to each other, and a liquid crystal layer between the above two substrates; wherein, during align molding of the array substrate and the color film substrate, the cell gap of the liquid crystal display panel should be maintained stable and uniform by the photo spacer on the color film substrate.

However, during carrying, moving of the liquid crystal display panel, or subsequent other process of the liquid crystal display panel, the liquid crystal display panel is subjected to extrusion of external force, and the photo spacer on the color film substrate easily shifts. The shifting photo spacer may scratch pixel units, affecting display quality; the shifting photo spacer also may result in light leak phenomenon occurring in the liquid crystal display panel; the shifting photo spacer also may result in display defect of Touch Mura occurring in the liquid crystal display panel.

SUMMARY

In view of this, for solving the problem in the prior art, the embodiments of the application provide a color film substrate, a display panel, a display device and a manufacture method for color film substrate, which can solve the problem that when the display panel is subjected to the extrusion of external force, the photo spacer on the color film substrate may easily shift which results in various display defects occurring in the display panel, can improve product yield of the display panel aligned, and can reduce probability of reworking and repairing.

For reaching the above objects, the embodiments of the application employ the following technical solution:

In an aspect, an embodiment of the application provides a color film substrate, comprising a underlying substrate, a shading layer on the underlying substrate and photo spacers on the shading layer; wherein, the photo spacer comprises a top surface, a bottom surface and side surfaces for connecting the top surface and the bottom surface; the top surface comprises at least one inclined face portion unparallel to the bottom surface.

Optionally, the color film substrate further comprises a color filter layer on the shading layer; the color filter layer comprises at least three kinds of color filter units with different color; and the photo spacers are situated in areas at which the color filter units of any one color overlap with the shading layer.

Optionally, the photo spacers comprise main photo spacers and auxiliary photo spacers; the main photo spacers are situated in the areas at which the color filter units of at least one color overlap with the shading layer; the auxiliary photo spacers are situated at the areas at which the color filter units of other colors overlap with the shading layer; the main photo spacer comprises a main top surface, a main bottom surface and main side surfaces for connecting the main top surface and the main bottom surface, and the main top surface comprises at least one inclined face portion unparallel to the main bottom surface; the auxiliary photo spacer comprises an auxiliary top surface, an auxiliary bottom surface and auxiliary side surfaces for connecting the auxiliary top surface and the auxiliary bottom surface, and the auxiliary top surface comprises at least one inclined face portion unparallel to the auxiliary bottom surface; wherein, the largest height from the main top surface to the main bottom surface is larger than the largest height from the auxiliary top surface to the auxiliary bottom surface.

Optionally, the main photo spacer comprises a first body, first long axis supporting sub-bodies connecting to the first body and first short axis supporting sub-bodies connecting to the first body; the first long axis supporting sub-bodies are at two sides of the first body in a first direction; the first short axis supporting sub-bodies are at two sides of the first body in a second direction perpendicular to the first direction; wherein, the top surface of the first body comprises a first supporting plane parallel to the main bottom surface; the top surface of the first long axis supporting sub-body comprises a first long axis inclined face unparallel to the main bottom surface, and the top surface of the first long axis supporting sub-body connects to the top surface of the first body; the top surface of the first short axis supporting sub-body comprises a first short axis inclined face unparallel to the main bottom surface, and the top surface of the first short axis supporting sub-body connects to the top surface of the first body; the top surface of the first body, the top surfaces of the first long axis supporting sub-bodies and the top surfaces of the first short axis supporting sub-bodies constitute the main top surface.

Optionally, in the main photo spacer, the number of the first short axis supporting sub-bodies is four, and the first short axis supporting sub-bodies are distributed at two sides of the first body symmetrically in the second direction.

Optionally, the auxiliary photo spacer comprises a second body, second long axis supporting sub-bodies connecting to the second body and second short axis supporting sub-bodies connecting to the second body; the second long axis supporting sub-bodies are at two sides of the second body in a first direction; the second short axis supporting sub-bodies are at two sides of the second body in a second direction perpendicular to the first direction; wherein, the top surface of the second body comprises a second supporting plane parallel to the auxiliary bottom surface; the top surface of the second long axis supporting sub-body comprises a second long axis inclined face unparallel to the auxiliary bottom surface, and the top surface of the second long axis supporting sub-body connects to the top surface of the second body; the top surface of the second short axis supporting sub-body comprises a second short axis inclined face unparallel to the auxiliary bottom surface, and the top surface of the second short axis supporting sub-body connects to the top surface of the second body; the top surface of the second body, the top surfaces of the second long axis supporting sub-bodies and the top surfaces of the second short axis supporting sub-bodies constitute the auxiliary top surface.

Optionally, the photo spacers are overall between the shading layer and the color filter units, the bottom surfaces of the photo spacers contact the shading layer directly, and the side surfaces and the top surfaces of the photo spacers all contact the color filter units directly; or the photo spacers are situated above the color filter units.

Optionally, the color film substrate further comprises a smoothing layer covering the color filter layer.

In another aspect, an embodiment of the application provides a display panel comprising an array substrate; the display panel further comprises the above color film substrate aligned with the array substrate.

In yet another aspect, an embodiment of the application provides a display device comprising the above display panel.

In yet another aspect, an embodiment of the application provides a manufacture method for a color film substrate, which comprises: providing a underlying substrate; providing a shading layer on the underlying substrate; providing photo spacers on the shading layer; wherein, the photo spacer comprises a top surface, a bottom surface and side surfaces connecting the top surface and the bottom surface; the top surface comprises at least one inclined face unparallel to the bottom surface.

Optionally, the manufacture method further comprises providing color filter layer on the underlying substrate; wherein, the color filter layer comprises at least three kinds of color filter units with different color; and the photo spacers are provided in areas at which the color filter units of any one color overlap with the shading layer.

Optionally, the manufacture method further comprises making the photo spacers overall be between the shading layer and the color filter units, the bottom surfaces of the photo spacers contact the shading layer directly, and the side surfaces and the top surfaces of the photo spacers all contact the color filter units directly; or making the photo spacers be above the color filter units.

Optionally, the manufacture method further comprises covering a smoothing layer on the color filter layer.

Based on this, after the color film substrate provided by the embodiment of the application is aligned with the array substrate to form a liquid crystal display panel, since the top surfaces of the photo spacers at the sides which are close to the aligned array substrate comprise at least one inclined face portion unparallel to the bottom surface, when the liquid crystal display panel is subjected to extrusion of external force, the inclined face can increase the areas in the photo spacers which bear and disperse the extrusion of external force, avoid the photo spacers shifting and thus scratching the pixel units due to subjected to the extrusion of external force. Besides, the issues of display defects such as light leakage or Touch Mura occurring in the liquid crystal display panel due to shifting can be avoided, the product yield of the display panel aligned is increased, and the probability of reworking and servicing is reduced.

BRIEF DESCRIPTION OF FIGURES

For illustrating the embodiments of the application or the technical solution in prior art more clearly, the attached figures needed for describing the embodiments or the prior art will be introduced briefly below. Obviously, the attached figures in the following description are only some embodiments of the application. For those ordinary skilled in the art, other figures can be obtained from these figures without expending creative effort.

DETAIL EMBODIMENTS

The technical solution in the embodiments of the application will be described clearly and completely below in conjunction with the figures in the embodiments of the application. Obviously, the embodiments described are only a portion of the embodiments of the application, rather all of the embodiments. Based on the embodiments in the application, all the other embodiments obtained by those skilled in the art without expending creative effort belong to the protection scope of the application.

Figure 1:
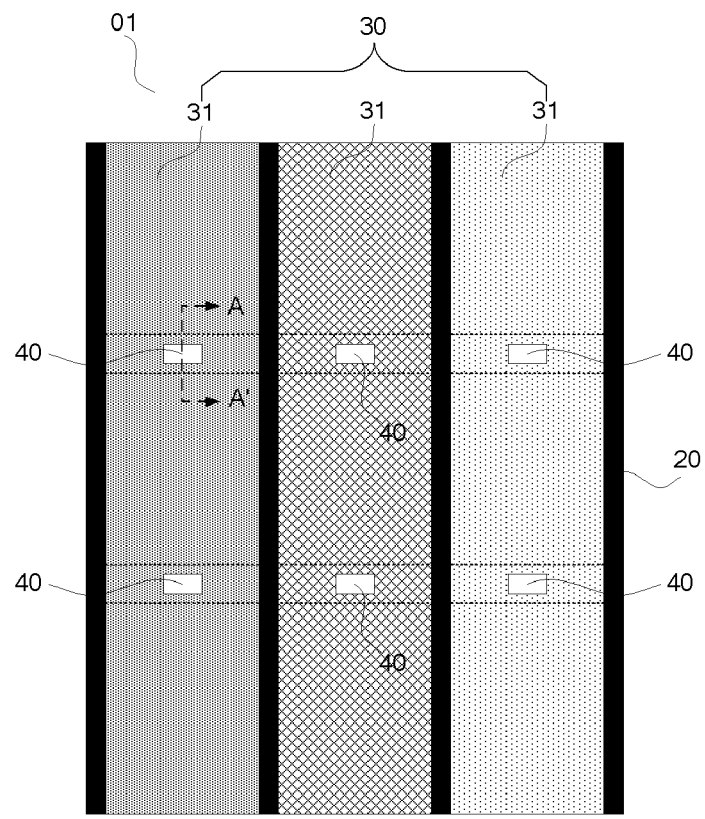
FIG. 1 is a first structural schematic top view of a color film substrate provided by an embodiment of the application.

An embodiment of the application provides a color film substrate 01. As shown in the top view of FIG. 1 and section views of FIGS. 2A-2C, the color film substrate 01 comprises a underlying substrate 10 (non shown in FIG. 1), a shading layer 20 on the underlying substrate 10 and photo spacers 40 on the shading layer 20; wherein, the photo spacer 40 comprises a top surface 40c, a bottom surface 40a and side surfaces 40b for connecting the top surface 40c and the bottom surface 40a; the top surface 40c comprises at least one inclined face portion 400c unparallel to the bottom surface 40a (such as form acute angles therewith).

Figure 2A:
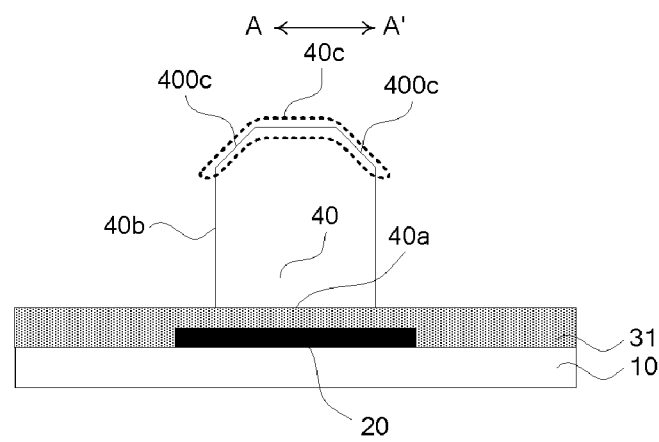
FIG. 2A is a first section structure schematic view along a A-A' direction in FIG. 1.
Figure 2B:
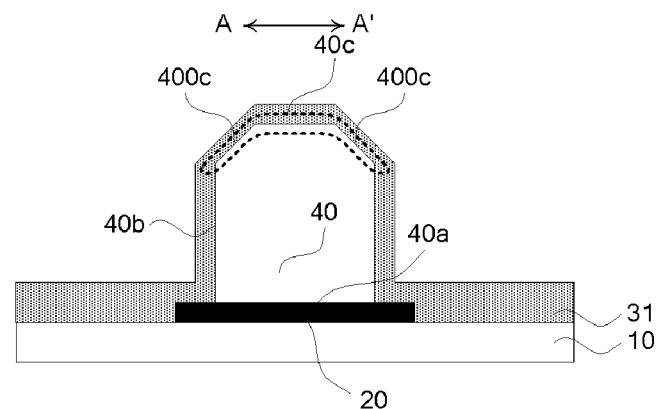
FIG. 2B is a second section structure schematic view along the A-A' direction in FIG. 1.
Figure 2C:
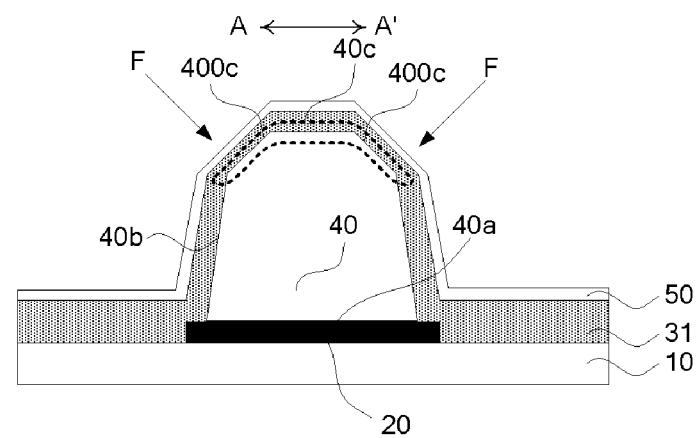
FIG. 2C is a third section structure schematic view along the A-A' direction in FIG. 1.

In should be noted that, the side surfaces 40b may be perpendicular to the bottom surface 40a as shown in FIGS. 2A and 2B; or the side surfaces 40b may also be inclined faces forming acute angles with the bottom surface 40a as shown in FIG. 2C. The embodiments of the application do not limit the specific structure of the side surfaces 40b, which can be designed flexibly.

Besides, the specific angle value of the above acute angle can be adjusted flexibly according to the specific dimensions of the color film substrate 01 and cell gap after aligning with the array substrate, which is not limited here.

Referring to FIG. 2C, when the direction of the extrusion of external force subjected by the liquid crystal display panel is the inclined direction directed by the arrow F in the figure, the inclined face 400c not only can increase the area in the photo spacer 40 which bears the extrusion of external force, but also further provides an auxiliary inclined supporting force for counteracting the extrusion of external force, so that the exerted force between the photo spacers 40 and the array substrate in the aligned liquid crystal display panel is more uniform, further avoiding the shifting of the photo spacers 40 due to extrusion of external force.

Based on this, after the color film substrate 01 provided by the embodiment of the application is aligned with the array substrate to form a liquid crystal display panel, since the top surfaces 40c of the photo spacers 40 at the sides close to the aligned array substrate comprise at least one inclined face 400c forming acute angles with the bottom surface 40a, when the liquid crystal display panel is subjected to extrusion of external force, the inclined faces 400c can increase the areas in the photo spacers 40 which bear and disperse the extrusion of external force, avoiding the photo spacers 40 shift and scratch the pixel units due to subjected to the extrusion of external force; besides, the issues of display defects such as light leakage or Touch Mura occurring in the liquid crystal display panel due to shifting can be avoided, the product yield of the display panel aligned is increased, and the probability of reworking and servicing is reduced.

Based on the above, referring to FIGS. 1 and 2A-2C, in the embodiment of the application, it is further preferred that, the color film substrate 01 further comprises a color filter layer 30 on the shading layer 20; the color filter layer 30 comprises at least three kinds of color filter units 31 with different color; the photo spacers 40 specifically are situated in the areas at which the color filter units 31 of any one color overlay with the shading layer 20.

As such, when manufacturing the color filter units 31 of different colors of the color film substrate 01, a row of color filter units 31 of a same color may be formed on the shading layer 20 corresponding to the color film units 31 of a same color by strip coating, so that the process of manufacturing color filter units 31 of different colors on the color film substrate 01 is simplified.

It should be noted that, the photo spacers 40 being at which layer of the color film substrate 01 does not been limited by the embodiments of the application. For example, referring to FIG. 2A, the photo spacers 40 are situated in the areas at which the color filter units 31 overlay with the shading layer 20 and specifically situated at the sides of the color filter units 31 which faces away from the underlying substrate 10, i.e. the photo spacers 40 shown in FIG. 2A are situated on the color filter units 31; alternatively, referring to FIGS. 2B and 2C, the photo spacers 40 are situated in the areas at which the color filter units 31 overlay with the shading layer 20 and overall between the color filter units 31 and the shading layer 20.

Besides, the three kinds of color filter units 31 with different color may be red, green, blue, and of course may be other colors, such as white, yellow, etc.

Based on this, referring to FIGS. 2B and 2C, in case that the photo spacers 40 are situated in the areas at which the color filter units 31 overlay with the shading layer 20 and overall between the color filter units 31 and the shading layer 20, since the photo spacers 40 are covered by the color filter units 31, the fixation of the photo spacers 40 on the shading layer 20 can be further improved, so that when the liquid crystal display panel formed by aligning the color film substrate 10 and the array substrate is subjected to extrusion of external force, the photo spacers 40 are harder to shift.

Therefore, Optionally, the bottom surface 40a of the photo spacers 40 contact the shading layer 20 directly, and the side surfaces 40b and top surfaces 40c of the photo spacers 40 all contact the color filter units 31 directly.

Further, referring to FIG. 2C, the color film substrate 01 further comprises a smoothing layer 50 covering the color filter layer 30. On the one hand, the smoothing layer 50 can further provide some protection for the color filter layer 30; on the other hand, since the photo spacers 40 are covered by the two layers of the color filter units 31 and the smoothing layer 50, the stability of the photo spacers 40 can be further improved when the liquid crystal display panel formed by aligning the color film substrate 10 and the array substrate is subjected to the extrusion of external force.

Figure 3A:
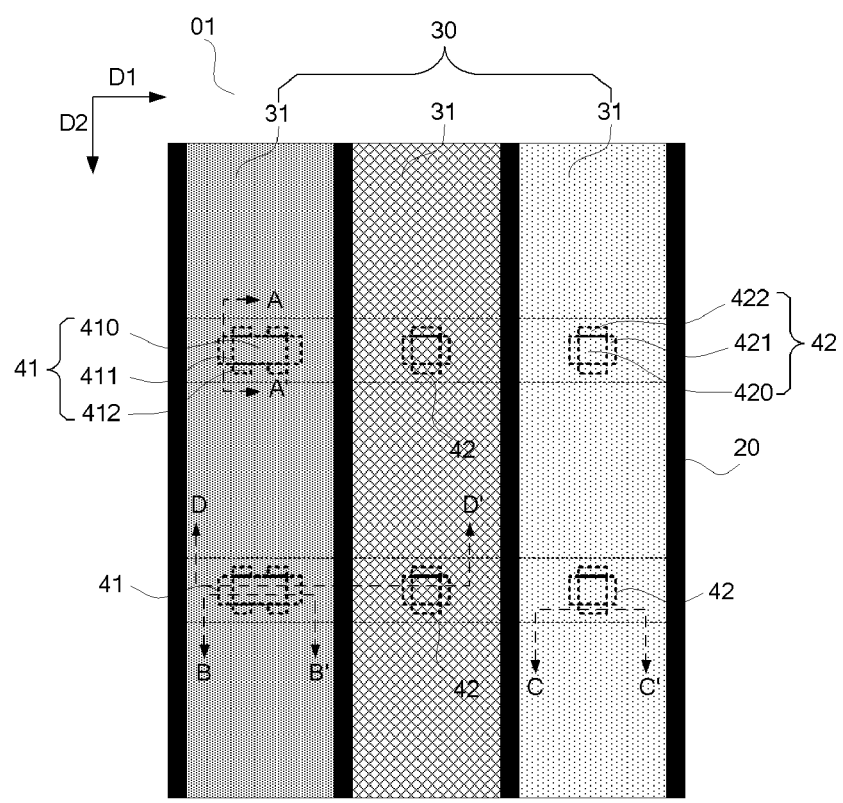
FIG. 3A is a second structural schematic top view of a color film substrate provided by an embodiment of the application.
Figure 3B:
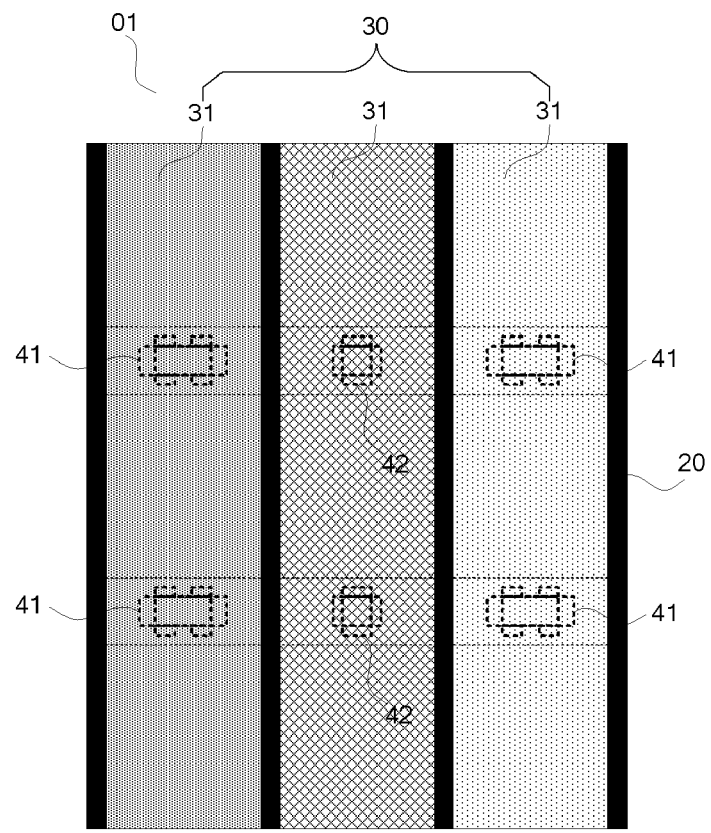
FIG. 3B is a third structural schematic top view of a color film substrate provided by an embodiment of the application.

Based on this, as shown in FIGS. 3A and 3B, the photo spacers 40 comprise main photo spacers 41 and auxiliary photo spacers 42; the main photo spacers 41 are situated in the areas at which the color filter units 31 of at least one color overlap with the shading layer 20; the auxiliary photo spacers 42 are situated at the areas at which the color filter units 31 of other colors overlap with the shading layer 20.

Figure 4A:
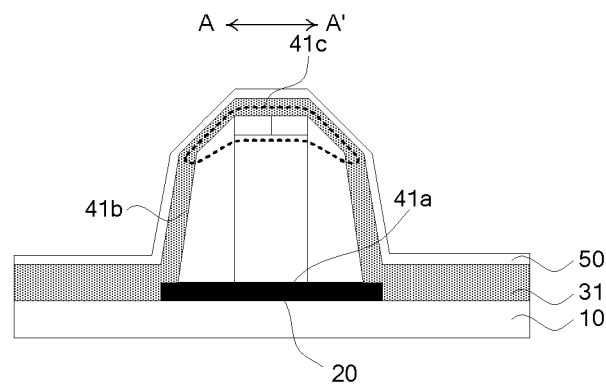
FIG. 4A is a first section structure schematic view along a A-A' direction in FIG. 3A.
Figure 4B:
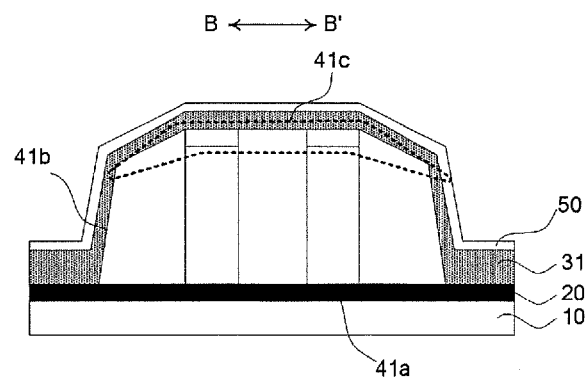
FIG. 4B is a first section structure schematic view along a B-B' direction in FIG. 3A.

As shown in FIGS. 4A and 4B, the main photo spacer 41 (not shown in the figures) comprises a main top surface 41c, a main bottom surface 41a and main side surfaces 41b for connecting the main top surface 41c and the main bottom surface 41a.

Figure 4C:
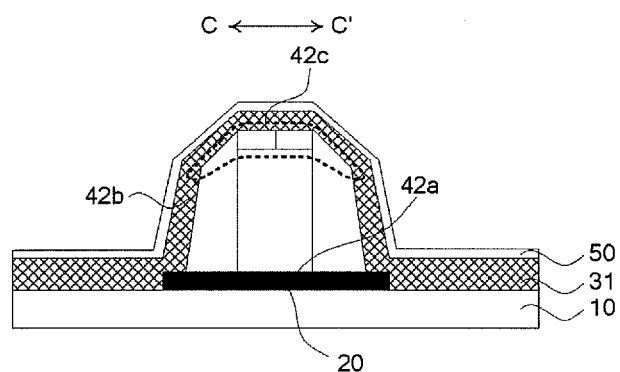
FIG. 4C is a first section structure schematic view along a C-C' direction in FIG. 3A.

As shown in FIG. 4C, the auxiliary photo spacer 42 (not shown in the figures) comprises an auxiliary top surface 42c, an auxiliary bottom surface 42a and auxiliary side surfaces 42b for connecting the auxiliary top surface 42c and the auxiliary bottom surface 42a.

Figure 4D:
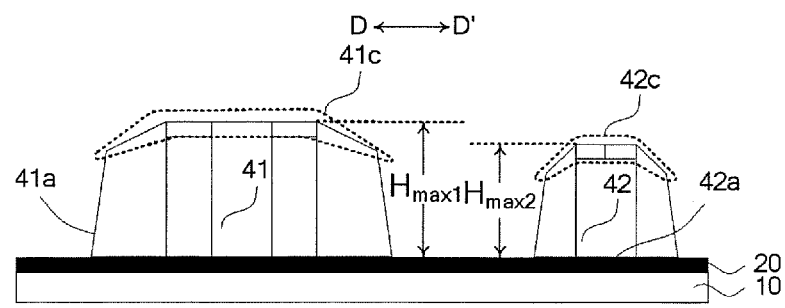
FIG. 4D is a section structure schematic view along a D-D' direction in FIG. 3A.

Wherein, as shown in FIG. 4D, the largest height (labeled as $H_{max1}$ both in the Figure and following description) from the main top surface 41c to the main bottom surface 41a is larger than the largest height (labeled as $H_{max2}$ both in the Figure and following description) from the auxiliary top surface 42c to the auxiliary bottom surface 42a.

It should be noted that, referring to FIG. 4D, after the color film substrate 01 is aligned with the array substrate, there is a certain height difference between the distance from the main top surface 41c to a side of the array substrate which faces towards the color film substrate 01 and the distance from the auxiliary bottom surface 42a to the same side of the array substrate which faces towards the color film substrate 01. As such, when the liquid crystal display panel aligned is subjected to extrusion of external force in the direction perpendicular to its panel, the height difference between the largest height $H_{max1}$ from the main top surface 41c to the main bottom surface 41a and the largest height $H_{max2}$ from the auxiliary top surface 42c to the auxiliary bottom surface 42a can provide a certain margin for buffering the vertical external force, so as to further improve the stability of anti-extrusion of external force of the liquid crystal display panel aligned.

Here, for representing the height difference between the $H_{max1}$ and $H_{max2}$ more clearly, the structures of the color filter units 31 and the smoothing layer 50 are omitted in FIG. 4D.

Further, the main photo spacers 41 specifically may consist of the following structures: as shown in FIG. 3A, the main photo spacer 41 comprise a first body 410, first long axis supporting sub-bodies 411 connecting to the first body 410, first short axis supporting sub-bodies 412 connecting to the first body 410.

The first long axis supporting sub-bodies 411 are at two sides of the first body 410 in a first direction (labeled as D1 both in the figure and the following description); the first short axis supporting sub-bodies 412 are at two sides of the first body 410 in a second direction (labeled as D2 both in the figure and the following description) perpendicular to the first direction D1.

Figure 5A:
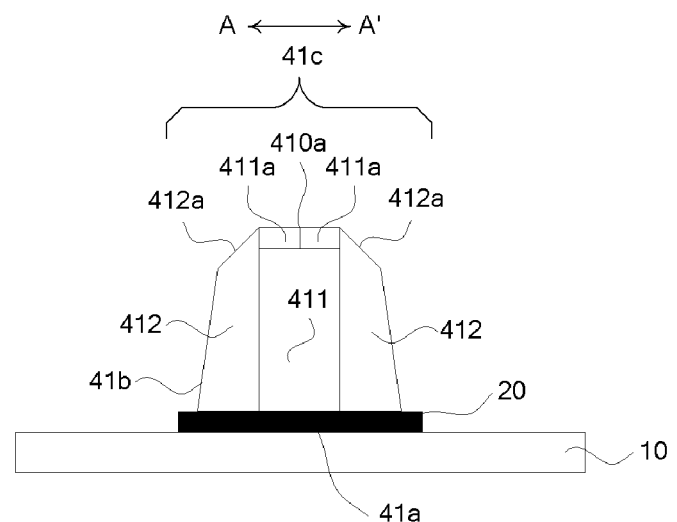
FIG. 5A is a second section structure schematic view along a A-A' direction in FIG. 3A.
Figure 5B:
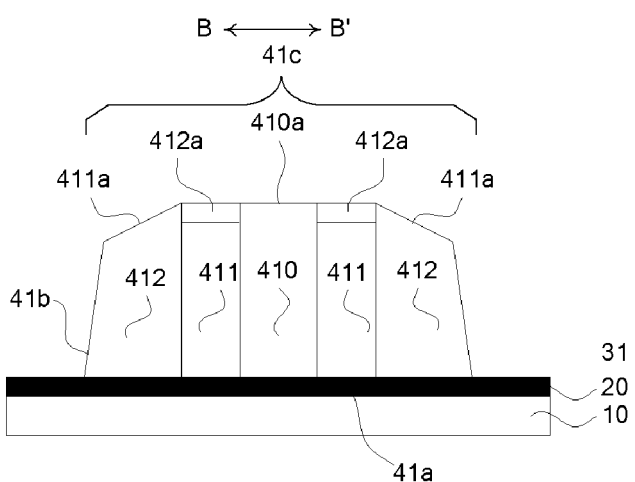
FIG. 5B is a second section structure schematic view along a B-B' direction in FIG. 3A.

Wherein, as shown in FIGS. 5A and 5B, the top surface of the first body 410 comprises a first supporting plane 410a parallel to the main bottom surface 41a; the top surface of the first long axis supporting sub-body 411 comprises a first long axis inclined face 411a unparallel to the main bottom surface 41a (such as forming an acute angle), and the top surface of the first long axis supporting sub-body 411 connects to the top surface of the first body 410; the top surface of the first short axis supporting sub-body 412 comprises a first short axis inclined face 412a unparallel to the main bottom surface 41a (such as forming an acute angle), and the top surface of the first short axis supporting sub-body 412 connects to the top surface of the first body 410; the top surface of the first body 410, the top surfaces of the first long axis supporting sub-bodies 411 and the top surfaces of the first short axis supporting sub-bodies 412 constitute the main top surface 41c. According to an specific embodiment, the first supporting plane 410a, the first long axis inclined faces 411a and the first short axis inclined faces 412a constitute the main top surface 41c.

It should be noted that, the first direction D1 and the second direction D2 are directions perpendicular to each other and parallel to the surface of the panel, and do not been limited.

Besides, the first supporting plane 410a of the first body 410 which is parallel to the main bottom surface 41a is used for making the liquid crystal display panel formed after aligning be able to better sustain the extrusion of external force in the direction perpendicular to the panel.

The first long axis supporting sub-bodies 411 and the first short axis supporting sub-bodies 412 are used for making the main photo spacer 41 have extension in various directions, making the liquid crystal display panel formed after aligning the color film substrate 01 with the array substrate be able to sustain the extrusion of external forces in various directions.

Accordingly, due to the different inclined directions thereof, the functions of the first long axis inclined faces 411a and the first short axis inclined faces 412a are also making the liquid crystal display panel aligned be able to sustain the extrusion of external forces in various directions.

Besides, the angle formed between the first long axis inclined face 411a and the main bottom surface 41a can be the same or different to the angle formed between the first short axis inclined face 412 and the main bottom surface 41a, and can be adjusted flexibly according to design requirement, and does not been limited here.

Based on the above, referring to FIG. 3A, in the main photo spacer 41, the number of the first short axis supporting sub-bodies 412 is at least four, and the short axis supporting sub-bodies 412 are distributed at two sides of the first body 410 symmetrically along the second direction D2, which can make the main photo spacer 41 be able to sustain the extrusion of external forces from various directions and make the forces applied on the main photo spacer 41 uniform.

Here, in order to represent the structure of the main photo spacer 41 more clearly and for sake of simplicity, the structures of the color filter units 31 and the smoothing layer 50 are omitted in FIGS. 5A and 5B.

Further, referring to FIG. 3A, the auxiliary photo spacer 42 consists of a second body 420, second long axis supporting sub-bodies 421 connecting to the second body 420 and second short axis supporting sub-bodies 422 connecting to the second body 420.

The second long axis supporting sub-bodies 421 are at two sides of the second body 420 in a first direction D1; the second short axis supporting sub-bodies 422 are at two sides of the second body 420 in a second direction D2 perpendicular to the first direction.

Figure 5C:
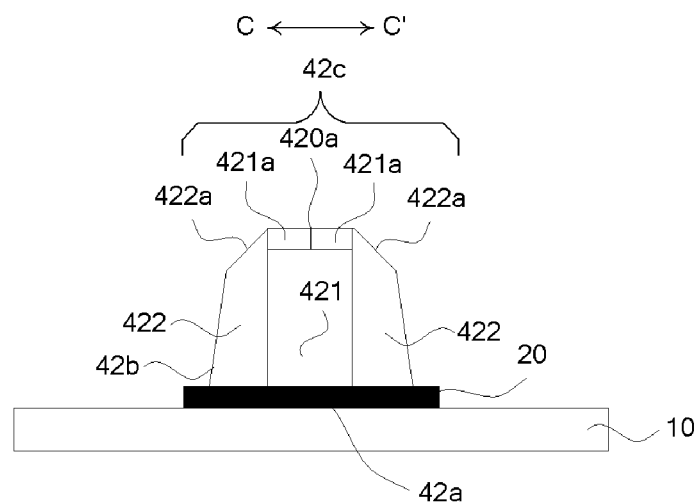
FIG. 5C is a second section structure schematic view along a C-C' direction in FIG. 3A.

Wherein, as shown in FIG. 5C, the top surface of the second body 420 comprises a second supporting plane 420a parallel to the auxiliary bottom surface 42a; the top surface of the second long axis supporting sub-body 421 comprises a second long axis inclined face 421a unparallel to the auxiliary bottom surface 42a (such as forming an acute angle), and the top surface of the second long axis supporting sub-body 421 connects to the top surface of the second body 420; the top surface of the second short axis supporting sub-body 422 comprises a second short axis inclined face 422a unparallel to the auxiliary bottom surface 42a (such as forming an acute angle), and the top surface of the second short axis supporting sub-body 422 connects to the top surface of the second body 420. The top surface of the second body 420, the top surfaces of the second long axis supporting sub-bodies 421 and the top surfaces of the second short axis supporting sub-bodies 422 constitute the auxiliary top surface 42c. According to an specific embodiment, the second supporting plane 420a, the second long axis inclined faces 421a and the second short axis inclined faces 422a constitute the auxiliary top surface 42c.

It should be noted that, the second supporting plane 420a of the second body 420 parallel to the auxiliary bottom surface 42a is used for making the liquid crystal display panel formed after aligning be able to better sustain the extrusion of external force in the direction perpendicular to the panel.

The second long axis supporting sub-bodies 421 and the second short axis supporting sub-bodies 422 have extensions in various directions, making the liquid crystal display panel formed after aligning the color film substrate 01 with the array substrate be able to sustain the extrusion of external forces in various directions.

Accordingly, due to the different inclined directions thereof, the functions of the second long axis inclined faces 421a and the second short axis inclined faces 422a are also making the liquid crystal display panel aligned be able to sustain the extrusion of external forces in various directions.

Besides, the angle formed between the second long axis inclined face 421a and the auxiliary bottom surface 42a can be the same or different to the angle formed between the second short axis inclined face 422a and the auxiliary bottom surface 42a, and can be adjusted flexibly according to design requirement, and does not been limited here.

Here, in order to represent the structure of the main photo spacer 41 more clearly and for sake of simplicity, the structures of the color filter units 31 and the smoothing layer 50 are omitted in FIG. 5C.

Based on this, after aligning the above color film substrate 01 provided by the embodiment of the application with the array substrate to form a liquid crystal display device, the various inclined faces of the main photo spacers 41 and the auxiliary photo spacers 52 towards different directions can increase obviously the areas of the main photo spacers 41 and the auxiliary photo spacers 41 for bearing and dispersing the extrusion of external force, avoiding the main photo spacers 41 and the auxiliary photo spacers 42 shifting due to subjected to the extrusion of external force and thus scratching the pixel units and resulting in the issues of display defects such as light leakage occurring in the liquid crystal display panel at the mean time, improving the product yield of the display panel aligned, and reducing the probability of reworking and servicing.

The embodiment of the application further provides a display panel, which comprises an array substrate and the above color film substrate 01 aligned with the array substrate.

The embodiment of the application further provides a display device, which comprises the above display panel.

Here, the above display device may specifically be a liquid crystal display device, may be any product or component with display function, such as a liquid crystal monitor, a liquid crystal television, a digital photo frame, a cell phone, or a tablet.

It should be noted that, all the figures of the application are brief schematic views of the above color film substrate, only for describing the present solution clearly, and representing the structure related to the inventive point. The other structures which are not related to the inventive point or the structures in prior art are not represented or only partly represented in the figures.

The above contents are only specific embodiments of the application. But the protection scope of the application is not limited by this. The variations or substitutions which can be easily thought of by those skilled in the art within the technical scope disclosed by the application should be covered by the protection scope of the application. Therefore, the protection scope of the application should be defined by the claims.

What is claimed is:

1. A color film substrate comprising:
   an underlying substrate;
   a shading layer on the underlying substrate; and
   a plurality of main photo spacers on the shading layer, each of the main photo spacers comprising:
      a main top surface;
      a main bottom surface; and
      main side surfaces for connecting the main top surface and the main bottom surface;
      wherein the main photo spacer comprises a first body, first long axis supporting sub-bodies connecting to the first body, and first short axis supporting sub-bodies connecting to the first body;
      wherein the first long axis supporting sub-bodies are at two sides of the first body in a first direction;
      wherein the first short axis supporting sub-bodies are at two sides of the first body in a second direction perpendicular to the first direction;
      wherein a top surface of the first body comprises a first supporting plane parallel to the main bottom surface;
      wherein a top surface of the first long axis supporting sub-body comprises a first long axis inclined face inclined relative to the main bottom surface, and the top surface of the first long axis supporting sub-body connects to the top surface of the first body;
      wherein a top surface of the first short axis supporting sub-body comprises a first short axis inclined face inclined relative to the main bottom surface, and the top surface of the first short axis supporting sub-body connects to the top surface of the first body; and
      wherein the top surface of the first body, the top surfaces of the first long axis supporting sub-bodies, and the top surfaces of the first short axis supporting sub-bodies constitute the main top surface.

2. The color film substrate according to claim 1, wherein the number of the first short axis supporting sub-bodies in the main photo spacer is four, and the first short axis supporting sub-bodies are distributed at two sides of the first body symmetrically in the second direction.

3. The color film substrate according to claim 1, further comprising:
   a color filter layer on the shading layer, the color filter layer comprising a plurality of color filter units of at least three different colors;
   wherein the main photo spacers are situated in areas at which the color filter units of at least one color overlap with the shading layer.

4. The color film substrate according to claim 3, further comprising a plurality of auxiliary photo spacers on the shading layer, wherein:
   the auxiliary photo spacers are situated in the areas at which the color filter units of other colors overlap with the shading layer;
   each auxiliary photo spacer comprises an auxiliary top surface, an auxiliary bottom surface and auxiliary side surfaces for connecting the auxiliary top surface and the auxiliary bottom surface, and the auxiliary top surface comprises at least one auxiliary inclined face portion inclined relative to the auxiliary bottom surface; and
   a largest height from the main top surface to the main bottom surface is larger than a largest height from the auxiliary top surface to the auxiliary bottom surface.

5. The color film substrate according to claim 4, wherein the auxiliary photo spacer comprises:
   a second body, second long axis supporting sub-bodies connecting to the second body, and second short axis supporting sub-bodies connecting to the second body;
   wherein the second long axis supporting sub-bodies are at two sides of the second body in a first direction;
   wherein the second short axis supporting sub-bodies are at two sides of the second body in a second direction perpendicular to the first direction;
   wherein a top surface of the second body comprises a second supporting plane parallel to the auxiliary bottom surface;
   wherein a top surface of the second long axis supporting sub-body comprises a second long axis inclined face inclined relative to the auxiliary bottom surface, and the top surface of the second long axis supporting sub-body connects to the top surface of the second body;
   wherein a top surface of the second short axis supporting sub-body comprises a second short axis inclined face inclined relative to the auxiliary bottom surface, and the top surface of the second short axis supporting sub-body connects to the top surface of the second body; and
   wherein the top surface of the second supporting body, the top surfaces of the second long axis supporting sub-bodies, and the top surfaces of the second short axis supporting sub-bodies constitute the auxiliary top surface.

6. The color film substrate according to claim 5, wherein:
   the main and auxiliary photo spacers are overall between the shading layer and the color filter units;
   the main bottom surfaces of the main photo spacers and the auxiliary bottom surfaces of the auxiliary photo spacers contact the shading layer directly;
   a disposition of the main side surfaces and the main top surfaces of the main photo spacers comprises at least one of contact with the color filter units directly and above the color filter units; and a disposition of the side surfaces and the top surfaces of the photo spacers comprises at least one of contact with the color filter units directly and above the color filter units.

7. The color film substrate according to claim 4, wherein:
the main and auxiliary photo spacers are overall between the shading layer and the color filter units;
the main bottom surfaces of the main photo spacers and the auxiliary bottom surfaces of the auxiliary photo spacers contact the shading layer directly;
a disposition of the main side surfaces and the main top surfaces of the main photo spacers comprises at least one of contact with the color filter units directly and above the color filter units; and
a disposition of the auxiliary side surfaces and the auxiliary top surfaces of the auxiliary photo spacers comprises at least one of contact with the color filter units directly and above the color filter units.

8. The color film substrate according to claim 3, wherein:
the main photo spacers are overall between the shading layer and the color filter units;
the main bottom surfaces of the main photo spacers contact the shading layer directly; and
a disposition of the main side surfaces and the main top surfaces of the main photo spacers comprises at least one of contact with the color filter units directly and above the color filter units.

9. The color film substrate according to claim 8, wherein the color film substrate further comprises a smoothing layer covering the color filter layer.

10. A display panel comprising:
an array substrate; and
a color film substrate which is aligned with the array substrate;
wherein the color film substrate comprises:
an underlying substrate;
a shading layer on the underlying substrate; and
a plurality of main photo spacers on the shading layer;
wherein each main photo spacer comprises:
a main top surface;
a main bottom surface; and
main side surfaces for connecting the main top surface and the main bottom surface;
wherein the main photo spacer comprises a first body, first long axis supporting sub-bodies connecting to the first body, and first short axis supporting sub-bodies connecting to the first body;
wherein the first long axis supporting sub-bodies are at two sides of the first body in a first direction;
wherein the first short axis supporting sub-bodies are at two sides of the first body in a second direction perpendicular to the first direction;
wherein a top surface of the first body comprises a first supporting plane parallel to the main bottom surface;
wherein a top surface of the first long axis supporting sub-body comprises a first long axis inclined face inclined relative to the main bottom surface, and the top surface of the first long axis supporting sub-body connects to the top surface of the first body;
wherein a top surface of the first short axis supporting sub-body comprises a first short axis inclined face inclined relative to the main bottom surface, and the top surface of the first short axis supporting sub-body connects to the top surface of the first body; and
wherein the top surface of the first body, the top surfaces of the first long axis supporting sub-bodies, and the top surfaces of the first short axis supporting sub-bodies constitute the main top surface.

11. A display device a comprising the display panel according to claim 10.

12. The display panel according to claim 10, wherein the number of the first short axis supporting sub-bodies in the main photo spacer is four, and the first short axis supporting sub-bodies are distributed at two sides of the first body symmetrically in the second direction.

13. The display panel according to claim 10, wherein the color film substrate further comprises:
a color filter layer on the shading layer, the color filter layer comprising a plurality of color filter units of at least three different colors;
wherein the main photo spacers are situated in areas at which the color filter units of at least one color overlap with the shading layer.

14. The display panel according to claim 13, wherein the color film substrate further comprises a plurality of auxiliary photo spacers on the shading layer, wherein:
the auxiliary photo spacers are situated in the areas at which the color filter units of other colors overlap with the shading layer;
each auxiliary photo spacer comprises an auxiliary top surface, an auxiliary bottom surface and auxiliary side surfaces for connecting the auxiliary top surface and the auxiliary bottom surface, and the auxiliary top surface comprises at least one auxiliary inclined face portion inclined relative to the auxiliary bottom surface; and
a largest height from the main top surface to the main bottom surface is larger than a largest height from the auxiliary top surface to the auxiliary bottom surface.

15. The color film substrate according to claim 14, wherein the auxiliary photo spacer comprises:
a second body, second long axis supporting sub-bodies connecting to the second body, and second short axis supporting sub-bodies connecting to the second body;
wherein the second long axis supporting sub-bodies are at two sides of the second body in a first direction;
wherein the second short axis supporting sub-bodies are at two sides of the second body in a second direction perpendicular to the first direction;
wherein a top surface of the second body comprises a second supporting plane parallel to the auxiliary bottom surface;
wherein a top surface of the second long axis supporting sub-body comprises a second long axis inclined face inclined relative to the auxiliary bottom surface, and the top surface of the second long axis supporting sub-body connects to the top surface of the second body;
wherein a top surface of the second short axis supporting sub-body comprises a second short axis inclined face inclined relative to the auxiliary bottom surface, and the top surface of the second short axis supporting sub-body connects to the top surface of the second body; and
wherein the top surface of the second supporting body, the top surfaces of the second long axis supporting sub-bodies, and the top surfaces of the second short axis supporting sub-bodies constitute the auxiliary top surface.

\* \* \* \* \*